United States Patent
Akirav et al.

(10) Patent No.: US 9,384,252 B2
(45) Date of Patent: *Jul. 5, 2016

(54) USER INITIATED REPLICATION IN A SYNCHRONIZED OBJECT REPLICATION SYSTEM

(71) Applicant: INTERNATIONAL BUSINESS MACHINES CORPORATION, Armonk, NY (US)

(72) Inventors: Shay Akirav, Tel Aviv (IL); Yariv Bachar, Tel Aviv (IL); Asaf Levy, Tel Aviv (IL); Oded Sonin, Tel Aviv (IL); Ron Edelstein, Tel Aviv (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/072,536

(22) Filed: Nov. 5, 2013

(65) Prior Publication Data

US 2014/0059007 A1 Feb. 27, 2014

Related U.S. Application Data

(63) Continuation of application No. 13/489,383, filed on Jun. 5, 2012.

(51) Int. Cl.
*G06F 17/30* (2006.01)

(52) U.S. Cl.
CPC .... *G06F 17/30575* (2013.01); *G06F 17/30578* (2013.01)

(58) Field of Classification Search
None
See application file for complete search history.

(56) References Cited

U.S. PATENT DOCUMENTS

| 5,937,414 | A | 8/1999 | Souder et al. |
| 7,567,991 | B2 | 7/2009 | Armangau et al. |
| 7,831,550 | B1 | 11/2010 | Pande et al. |
| 7,844,787 | B2 * | 11/2010 | Ranganathan et al. ....... 711/162 |
| 8,086,565 | B2 | 12/2011 | Sagar et al. |
| 8,135,930 | B1 * | 3/2012 | Mattox et al. ................. 711/162 |
| 8,489,831 | B2 * | 7/2013 | Thompson et al. ........... 711/162 |
| 2010/0082538 | A1 | 4/2010 | Rentsch et al. |

OTHER PUBLICATIONS

Yuan et al., "Improvement of Snapshot Differential Algorithm Based on Hadoop Platform," Cross Strait Quad-Regional Radio Science and Wireless Technology Conference, 2011 (3 pages).
Agarwal et al., "Snapshots in Hadoop Distributed File System," (5 pages).
Shvachko et al., "The Hadoop Distributed File System," IEEE, Sunnyvale, CA, 2010 (10 pages).
Borthakur, "The Hadoop Distributed File System: Architecture and Design," 2007 (14 pages).

* cited by examiner

*Primary Examiner* — Belix M Ortiz Ditren
(74) *Attorney, Agent, or Firm* — Griffiths & Seaton PLLC

(57) ABSTRACT

A snapshot of selected objects in a source repository is created in response to the user-initiated replication. The snapshot is designated as a snapshot replication job. The snapshot replication job is added to the end of a replication queue to await execution for the synchronized object replication. Unsynchronized objects in a target destination are detected by comparing a state of the selected objects in the snapshot with a current state of the target destination at the time of execution of the snapshot replication job. The unsynchronized objects in the target destination are synchronized based upon the comparison of the state of the selected objects in the snapshot with the current state of the target destination at the time of execution of the snapshot replication job.

6 Claims, 4 Drawing Sheets

USER INITIATED REPLICATION IN A SYNCHRONIZED OBJECT REPLICATION SYSTEM

CROSS REFERENCE TO RELATED APPLICATIONS

This application is a Continuation of U.S. patent application Ser. No. 13/489,383, filed on Jun. 5, 2012.

FIELD OF THE INVENTION

The present invention relates generally to computers, and more particularly, to user initiated replication in a synchronized object replication system.

DESCRIPTION OF THE RELATED ART

In today's society, computer systems are commonplace. Computer systems may be found in the workplace, at home, or at school. Computer systems may include data storage systems, or disk storage systems, to process and store data. One such process is data replication. Replicated data systems may externalize various logical data storage entities, such as files, data objects, backup images, data snapshots or virtual tape cartridges. It is often required that such data storage entities be replicated from their origin site to remote sites. Replicated data entities enhance fault tolerance abilities and availability of data. While several existing approaches may be used to perform data replication, these approaches have accompanying limitations that negatively affect replication efficiency, system performance and data consistency, require additional overhead, or any combination of the above challenges.

SUMMARY OF THE INVENTION

Data replication involves the backing up of data stored at a primary site by storing the exact duplicate of the data on a secondary or remote site. Using data replication processes provide a variety of benefits. Data replication has emerged in recent years as a highly important technological field in computing storage systems. Challenges to providing data replication functionality exist in synchronized replication system where it is required that there are strict relations between objects, such that object A with state X requires that object B has state Y. In synchronized replication systems, when establishing a new replication context between the source and destination or adding an additional set of objects to the context, there is a state of in-synchronization as only new operations on the objects are sent to the destination. Thus, it is required to initiate replication of the unsynchronized objects in their current state.

As such, a need exists for a solution allowing for a user initiated replication process in a synchronized object replication system. Also, a need exists for performing the user-initiated replication of the unsynchronized objects without being disruptive to creation and manipulation of the objects at the source repository while avoiding violating the normal order of replication for new operations in the source. In addition, a need exists allowing for a user to initiate the replication of a set of objects, regardless of the set of objects' synchronization state, for efficiently detecting the objects that require replication, and limiting the replication to the detected objects requiring replication.

Accordingly, and in view of the foregoing, various exemplary method, system, and computer program product embodiments for user-initiated replication in a synchronized object replication system in a computing environment are provided. In one embodiment, by way of example only, a snapshot of selected objects in a source repository is created in response to the user-initiated replication. The snapshot is designated as a snapshot replication job. The snapshot replication job is added to the end of a replication queue to await execution for the synchronized object replication. Unsynchronized objects in a target destination are detected by comparing a state of the selected objects in the snapshot with a current state of the target destination at the time of execution of the snapshot replication job. The unsynchronized objects in the target destination are synchronized based upon based upon the comparison of the state of the selected objects in the snapshot with the current state of the target destination at the time of execution of the snapshot replication job.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
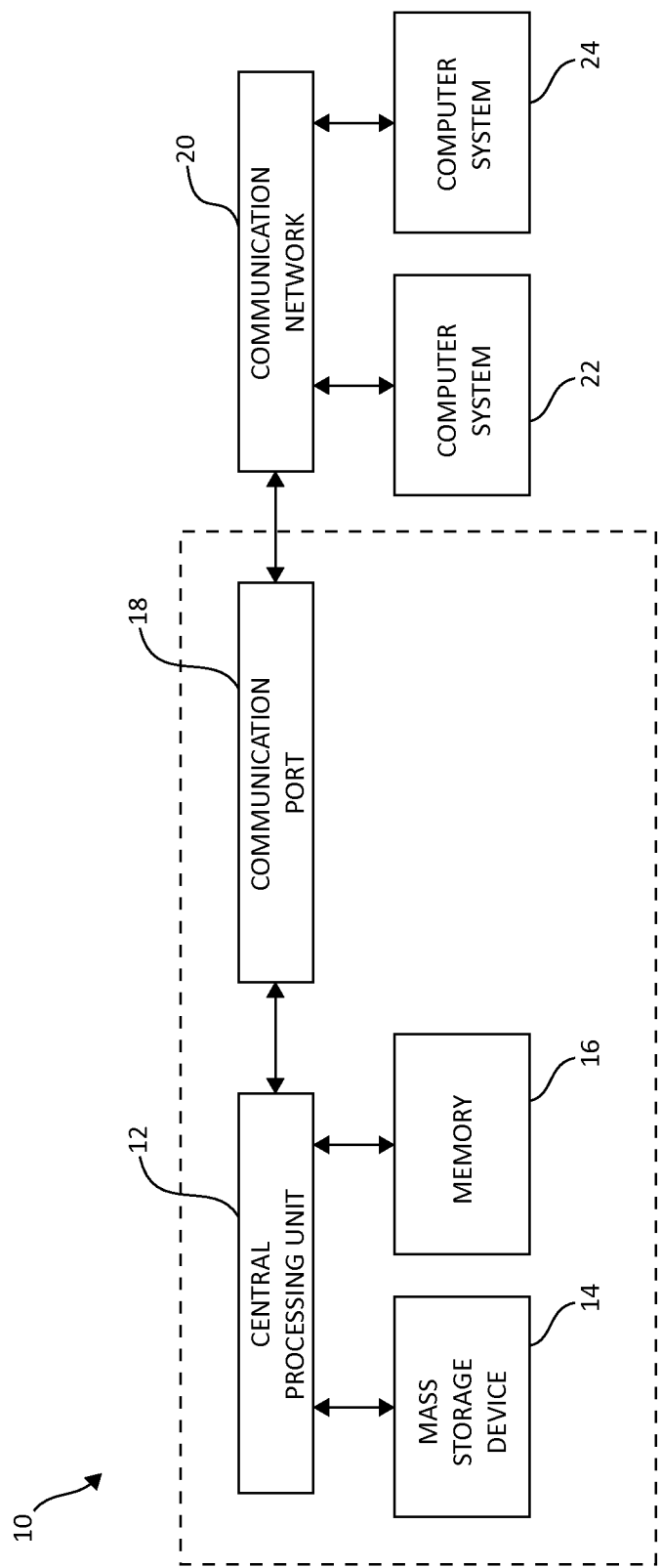
FIG. 1 is a block diagram illustrating a computing system environment having an example storage device in which aspects of the present invention may be realized.

Throughout the following description and claimed subject matter, the following terminology, pertaining to the illustrated embodiments, is described. A "Replication context" is intended to refer to a user-defined association between a set of source objects and a destination. All source operations on the set of objects are to be replicated to the destination. A "Replication job" is intended to refer to a task to replicate an object operation in from the source (e.g., a source repository) to a destination (e.g., a target destination). A "Snapshot" is intended to refer to a collaborative state of an object set at a certain point in time. The snapshot includes the objects' data and metadata at the time of the snapshot creation. The snapshot maintains the state of the objects even if they are changed or deleted. A "Replication Queue" is intended to refer to a queue that holds the replication jobs that are pending execution. The replication queue is a strict first-in-first-out queue, such that the replication jobs are performed in the destination (e.g., target destination) at the exact order in which they happened in the source (e.g., source repository). A "system" may include a computer system, a computer processor, a primary storage system, a remote storage system or any other component within a computer environment needed to carry out the claimed invention.

An "Object unique ID" is intended to refer to an attribute of the object, uniquely identifying the object within the group of replication systems. An "Object state ID" is intended to refer to an attribute of the object state, identifying the state of the object. The object state ID is unique for a certain state of an object and changes when the object data or metadata changes. A "Replication engine" is intended to refer to the module responsible for the physical replication of data. A "Replication task" is intended to refer to a request to the replication engine, to perform the physical replication of the object data or metadata.

As mentioned above, data replication involves the backing up of data stored at a primary site by storing the exact duplicate of the data on a secondary or remote site. Moreover, object replication is the method of replicating objects at a logical level rather than replicating at a storage block level. Similar to block-level storage replication, object replication can be either synchronized or unsynchronized. In synchronized mode, every operation on the objects at the source repository is mirrored to the destination repository. The operations are performed in the destination at the same order in which they were performed in the source. While in unsynchronized mode, there is no requirement to perform the operations in order, but merely to maintain some stable state of the objects in the destination. A synchronized replication system is required when there are strict relations between the objects, such that object A with state X requires that object B has state Y. For example, in synchronized replication systems, sub-directories and/or files rely on parent directories.

In such systems, when establishing a new replication context between the source and destination or adding an additional set of objects to the context, there is a state of in-synchronization as only new operations on the objects are sent to the destination. Thus, it is required to initiate replication of the unsynchronized objects in their current state.

As such, a need exists for a solution allowing for a user initiated replication process in a synchronized object replication system. Also, a need exists for performing the user-initiated replication of the unsynchronized objects without being disruptive to creation and manipulation of the objects at the source repository while avoiding violating the normal order of replication for new operations in the source. In addition, a need exists allowing for a user to initiate the replication of a set of objects, regardless of the set of objects' synchronization state, for efficiently detecting the objects that require replication, and limiting the replication to the detected objects requiring replication.

To address these needs, the mechanisms of the illustrated embodiments seek to provide a solution allowing for a user initiated replication of the unsynchronized objects that is non disruptive to creation and manipulation of the objects at the source repository without violating the normal order of replication of new operations in the source. In one embodiment, by way of example only, the mechanisms provide a user-initiated replication of a set of objects, regardless of the set of objects synchronization state, efficiently detect the objects that require replication, and limit the replication to only to the detected objects requiring replication.

Moreover, by way of example only, the mechanisms of the present invention provide for a scalable and efficient user initiated replication in a synchronized object replication system that satisfies the following essential requirements. 1) The mechanisms allow the user to perform replication of a set of objects, independent of their actual synchronization state. 2) The mechanisms efficiently detect the unsynchronized objects, which require replication. 3) The mechanisms do not disrupt the local creation, deletion and manipulation of objects. 4) The mechanisms will not compromise the normal replication order of the source operations. 5) The mechanisms all for the user initiated replication of a set of objects independent of the actual replication procedures.

The mechanisms of the present invention accomplish each of these factors regardless of the system size and number of objects. Moreover, the mechanisms of the present invention enable initiation of replication for a set of objects, regardless of their synchronization state, whilst remaining independent of the replication procedures, protocol and/or file-system layout, representation and implementation.

In one embodiment, by way of example only, the synchronous object replication operations of the present invention may be simply described by the addition of new source operations under the replication context as replication jobs to the end of the replication queue in the order in which they occur. The mechanisms execute the jobs by taking a job from the head of the replication queue and performing the source operation the replication job describes in the destination. As the replication jobs are added to the replication queue in the order in which they occur in the source, and are performed sequentially, the replication jobs occur in the destination at the exact order in which they occurred in the source.

Because the synchronous object replication mechanism only performs replication of new operations on the objects, when creating the replication context or when adding additional objects to it, these objects do not exist in the destination and are considered unsynchronized. As such, the mechanisms for the present invention provide for a solution that enables scalable and efficient replication initiation of an object set within the basic replication flow, which allows replication of the objects regardless of their synchronization state.

In one embodiment, upon replication initiation on an object set by a user, the mechanisms create a snapshot of the selected object set. The mechanisms assume that the underlying objects layout and representation supports a time efficient snapshot creation process. Moreover, the mechanisms assume that the snapshot creation process is not disruptive to other local object operations. The snapshot is then added to the end of the replication queue as a new replication job. The synchronous replication mechanisms ensure the execution of the replication jobs in the exact order the replication jobs occurred, all operations that occurred before the snapshot creation are sure to be replicated before the snapshot replication job is replicated, and all operations that occurred after the snapshot replication creation are to be replicated after the snapshot replication.

Turning now to FIG. 1, exemplary architecture 10 of a computing system environment is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and 22 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24 and 22. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
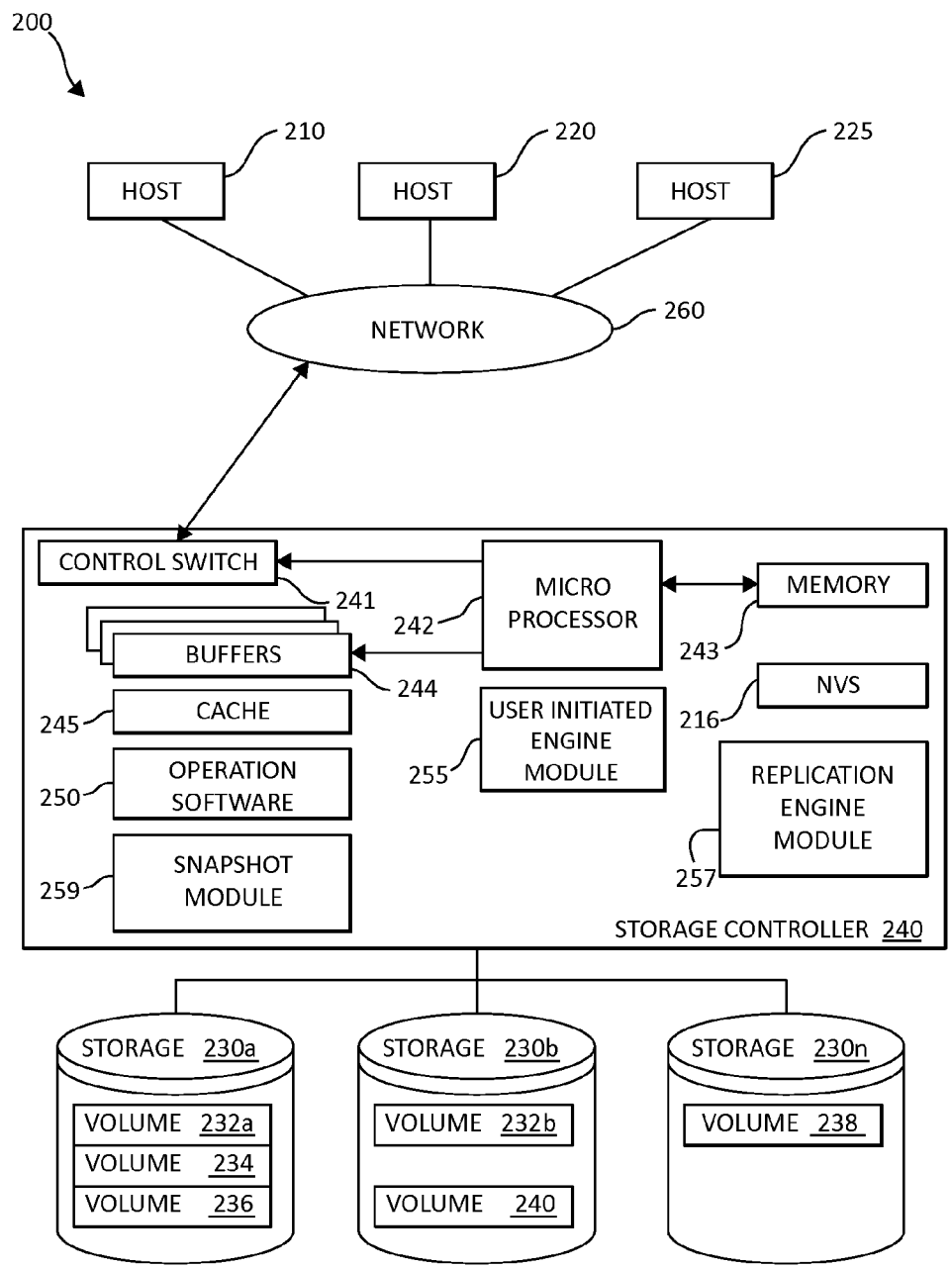
FIG. 2 is a block diagram illustrating a hardware structure of an exemplary data storage system in a computer system in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 (labeled as 230a, 230b, and 230n in FIG. 3) may be comprised of one or more storage devices, such as storage arrays, which are connected to storage controller 240 (by a storage network) with one or more cluster hosts 210, 220, and 225 connected to each storage controller 240.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein.

In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a user initiated replication module 255, replication engine module 257, and snapshot module 259. The user initiated replication module 255, replication engine module 257, and snapshot module 259 may work in conjunction with each and every component of the storage controller 240, the hosts 210, 220, 225, and storage devices 230. The user initiated replication module 255, replication engine module 257, and snapshot module 259 may be structurally one complete module or may be associated and/or included with other individual modules. The user initiated replication module 255, replication engine module 257, and snapshot module 259 may also be located in the cache 245 or other components.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control and each table described later, cache 245 for temporarily storing (buffering) data, and buffers 244 for assisting the cache 245 to read and write data, a control switch 241 for controlling a protocol to control data transfer to or from the storage devices 230, user initiated replication module 255, replication engine module 257, and snapshot module 259, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

In one embodiment, the host computers or one or more physical or virtual devices, 210, 220, 225 and the storage controller 240 are connected through a network adaptor (this could be a fibre channel) 260 as an interface i.e., via at least one switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, user initiated replication module 255, replication engine module 257, and snapshot module 259 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

As mentioned above, the user initiated replication module 255, replication engine module 257, and snapshot module 259 may also be located in the cache 245 or other components. It should be noted that the RAM module 259 can be compared to short-term memory and the hard disk to the long-term memory. In other words, the RAM module 259 is random access memory. The RAM (random access memory) is the place in a computer where the operating system, application programs, and data in current use are kept so that they can be quickly reached by the computer's processor 242. The RAM is much faster to read from and write to than the other kinds of storage in a computer, the hard disk, floppy disk, and CD-ROM. As such, one or more user initiated replication module 255, replication engine module 257, and snapshot module 259 maybe used as needed, based upon the storage architecture and users preferences.

Figure 3:
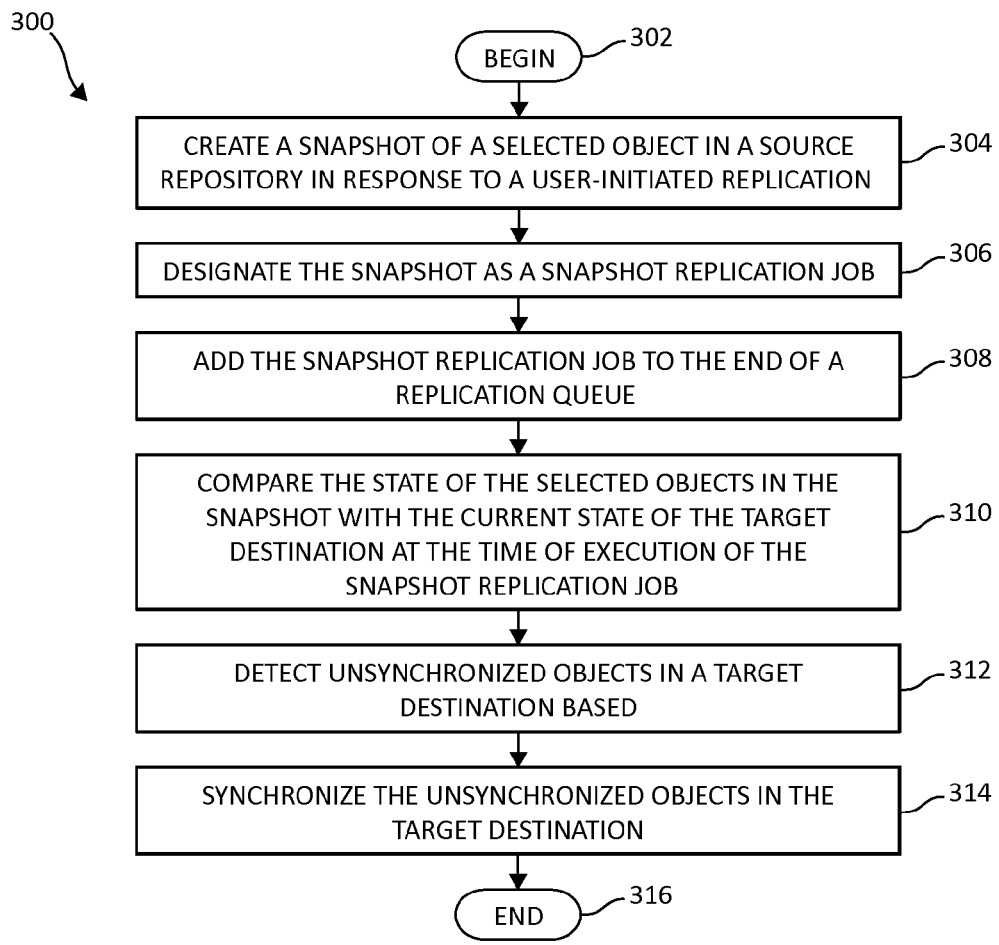
FIG. 3 is a flow chart diagram illustrating an exemplary method for user initiated replication in a synchronized object replication system.

Turning now to FIG. 3, a flowchart illustrating an exemplary method 300 for user initiated replication in a synchronized object replication system. The method 300 begins (step 302) by creating a snapshot of selected objects in a source repository in response to the user initiated replication (step 304). A snapshot is designated as a snapshot replication job (step 306). The snapshot replication job is added to the end of a replication queue to await execution for the synchronized object replication (step 308). It should be noted that the method 300 may use a replication queue by adding the snapshot replication job to the replication queue in order to replicate a snapshot of the objects set requested by the user for replication. The state of the selected objects in the snapshot is compared with a current state of the target destination at the time of execution of the snapshot replication job (step 310). Based upon the comparison, the method 300 will detect unsynchronized objects in a target destination (step 312). The unsynchronized objects in the target destination are synchronized based upon the comparing (step 314). The method 300 ends (step 316).

To further illustrate the operations of the present invention, as described in FIG. 3, consider the mechanisms being employed in a synchronous file system replication system. A replication context is the association between a source and destination directories. All operations under the source directory are to be reflected to the destination directory. An object in this system is a node in the file system tree, e.g. file or a directory. In one embodiment, the object operations are split to data and metadata operations. The data operations are either the write operations of new data or the deletion operations of old data. The metadata operations are either a change in a node's metadata or the change of the tree structure. Such operations are added to the replication queue in the order in which they occurred and are executed in the destination sequentially. In so doing, the mechanisms ensure that the destination always holds a consistent image that once existed in the source.

Moreover, a replication context may be created when there are already existing objects in the source. In a file system these may be directories with files. For example, the replication context is the connection between the directory "/a" in the source system and the directory "/a" in the destination system. At the time the replication context is created, the directory "/a/b" already exists in the source, including a complex sub-tree under it. As the synchronous replication mechanism only replicates new operations, the content and structure of "/a/b" will not be replicated unless changed.

A user then goes ahead and creates the new directory, for example "/a/c/", in the source and creates another sub-tree under it. As these new operations are done under the replication context supervision, they are all added to the replication queue and are scheduled for replication. At a certain point in time, the user may wish to fully synchronize "/a" to the destination. The user does this by initiating replication on the "/a" directory. As described in FIG. 3, the mechanisms create a snapshot of "/a" at the time of initiation and adds it as another replication job to the replication queue.

At the time of initiation, the replication queue may not be empty, which means there are source operations on "/a/c" that have not yet been replicated to the destination. In other words at the time of execution, the destination state of "/a/c" does not match the one in the source snapshot. Because the replication synchronous mechanisms ensure that the replication jobs are executed in order, the mechanisms ensure that when the snapshot replication job is executed, all previous operations on "/a/c" that occurred before its creation have already been replicated and that no operations on "/a/c" that occurred after the snapshot creation had been replicated. In other words, this means that at the time of execution, the destination holds an exact copy of "/a/c" as the one in the snapshot.

Continuing on with the example-scenario, the mechanisms operate by comparing the objects in the snapshot with the ones in the destination, which does so by traversing the snapshot and comparing the tree structure, data, and metadata with the destination. Moreover, when the traversing and/or the comparing operations are performed, the mechanism may discover that all of "/a/c" matches the snapshot and no replication for the snapshot is needed. However, all of "/a/b" will be missing in the destination, so the mechanisms may open replication tasks in the replication engine for the actual replication of the data and metadata for all of the nodes in the snapshot under "/a/b".

The mechanisms wait for all of the replication tasks to complete, and then, finalize the snapshot replication job and allow the source operations that occurred after it to replicate. In so doing, the mechanisms ensure that when the snapshot replication completes, the destination holds the exact image of "/a" at the time of replication initiation by the user. As the snapshot replication did not perform any manipulations on "/a/c" in the destination, the state of "/a/c" is not affected and the source operations in the queue for "/a/c" can continue to replicate.

In one embodiment, as may be described below in FIG. 4, the mechanisms allow for a user initiated replication objects set by creating a snapshot for the objects set, creating a new replication job for the snapshot, and adding the new replication job to the replication queue. The execution of the snapshot replication job is done by performing comparisons between the objects in the source snapshot and the objects in the destination and issuing replication of the unsynchronized objects in the snapshot that require replication.

Figure 4:
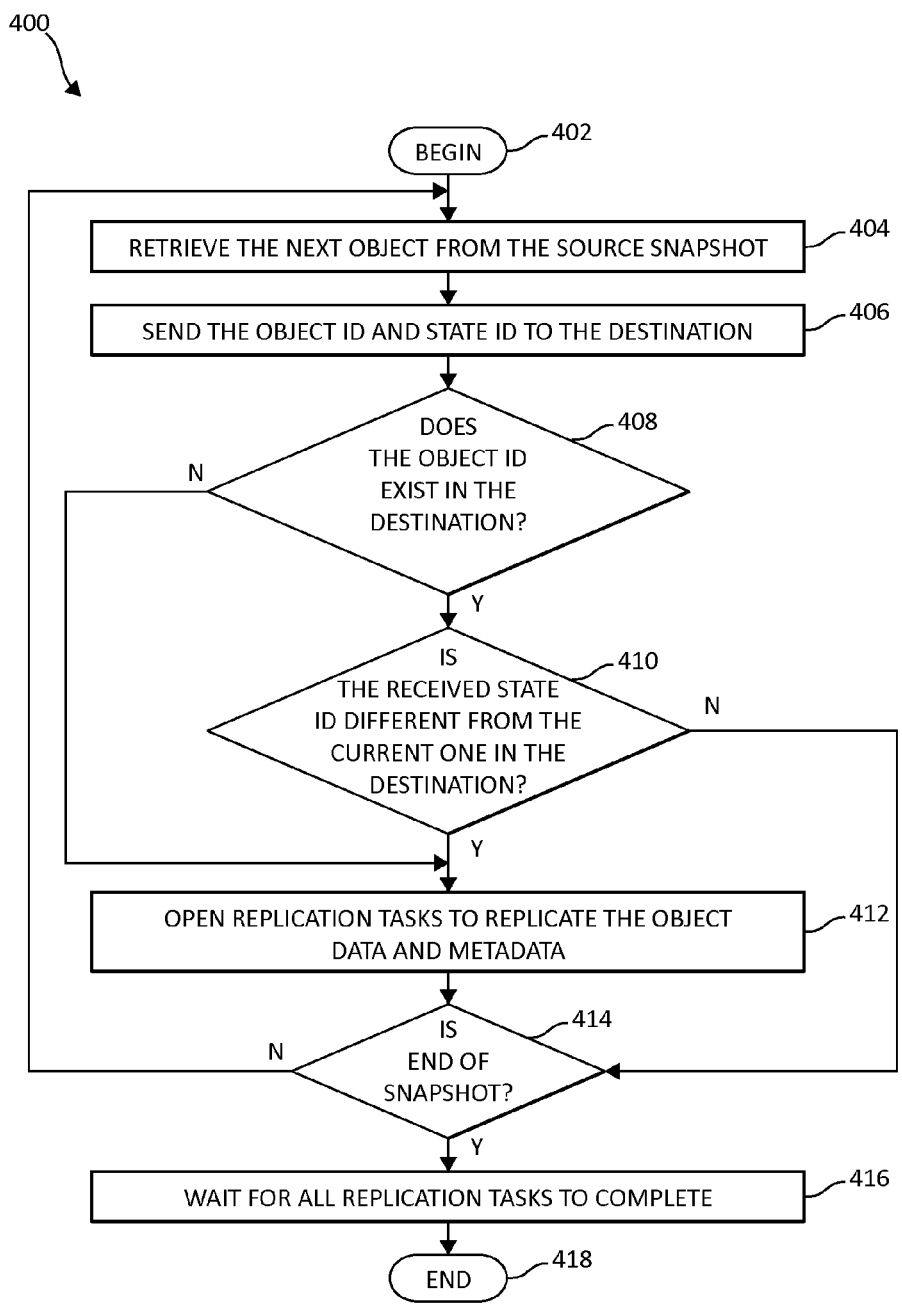
FIG. 4 is a flow chart diagram illustrating an exemplary method for execution of a snapshot replication job.

The procedure for execution of the snapshot replication job is hereby described by turning now to FIG. 4. FIG. 4 is a flowchart illustrating an exemplary method 400 for the execution of a snapshot replication job. The method 400 begins (step 402) by retrieving in an orderly fashion the next object from the source snapshot (step 404). The method 400 will send the object ID and the state ID of the next retrieved object to the target destination (step 406). The method 400 will determine if the object ID exists in the target destination (step 408). If no, the method 400 may open replication tasks to replicate the object data and metadata (step 412). If yes, the method 400 determines if the received state ID (e.g., received from the next selected object) is different from the current state ID in the target destination (step 410). If yes, the method 400 will open replication tasks to replicate the object data and metadata (step 412). If no, the method 400 determines if the end of the snapshot has been reached (step 414). If yes, the method 400 will wait for all replication tasks to complete (step 416). If no, the method 400 returns to step 404 and retrieves the next object from the source snapshot (step 404). Returning now to step 412, upon completion of opening replication tasks to replicate the object data and metadata, the method 400 moves to step 414. Again, the method 400 determines if the end of the snapshot has been reached (step 414). If yes, the method 400 will wait for all replication tasks to complete (step 416). If no, the method 400 returns to step 404 and retrieves the next object from the source snapshot (step 404). The method 400 ends (step 418).

Upon execution of the snapshot replication job, as described above in FIG. 4, the state of the objects included in the snapshot is compared with their current state in the destination. The mechanisms perform the comparison on a lightweight representation of the objects (e.g. version and/or hash value) and not on the full object data thereby enabling a scalable and efficient operation. The mechanisms discover the destination objects that are not synchronized and update them according to the state in the source snapshot.

In one embodiment, snapshot replication mechanisms have special traits, which enable scalable and efficient user initiated replication in a synchronized replication system, satisfying the comprehensive set of requirements listed as follows. 1) The mechanisms allow the user to perform replication of a set of objects, independent of their actual synchronization state. 2) The mechanisms efficiently detect unsynchronized objects by comparing their state in the destination with their state in the source snapshot. 3) The mechanisms of the present invention do not disrupt the local creation and manipulation of objects as the mechanisms only create a snapshot of the state of the objects, using the efficient snapshot mechanism provided by the logical storage system. 4) The mechanisms do not compromise the normal replication order of the source operations as snapshot is added to the replication as another replication job. 5) The mechanisms allow for the user-initiated replication of a set of objects to be independent of the actual replication procedures.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for user initiated replication in a synchronized object replication system in a computing environment using a processor device, comprising:
    creating a snapshot of selected objects in a source repository in response to the user initiated replication, wherein the snapshot is designated as a snapshot replication job;
    adding the snapshot replication job to an end of a replication queue to await execution for the synchronized object replication;
    detecting unsynchronized objects in a target destination by comparing a lightweight representative state of the selected objects in the snapshot with a current state of the target destination at the time of execution of the snapshot replication job, wherein the unsynchronized objects in the target destination are synchronized in an order they were added based upon the comparison of the lightweight representative state of the selected objects in the snapshot with the current state of the target destination at the time of execution of the snapshot replication job;
    retrieving in an ordered manner at least one object of the selected objects from the snapshot;
    sending an object identification (ID) and a state ID of the at least one object to the target destination;
    searching for the object ID in the target destination, wherein if the object ID is located, the state ID of the at least one object is compared with a current state ID of the target destination; and
    if neither the object ID exists in the target destination and the state ID of the at least one object and the current state ID of the target destination do not match, replication tasks are opened for replicating data and metadata of the at least one object to the target destination.

2. The method of claim 1, further including, performing one of:
    if an operation occurs prior to the creating, replicating the operation prior to replication the snapshot replication job, and
    if an operation occurs after the creating, replicating the operation after replicating the snapshot replication job.

3. The method of claim 2, further including, separating the operation into a data operation and a metadata operation, wherein the data operation is one of a write new data and deletion of old data, and the metadata operation is one of changing metadata of a node and changing a tree structure.

4. The method of claim 1, further including, in conjunction with the comparison, traversing the snapshot by comparing at least one of a tree structure, data, and metadata of the snapshot with objects in the target destination.

5. The method of claim 1, further including, in conjunction with the user initiated replication of the selected objects, replicating the selected objects independent of an actual synchronized state of the selected objects.

6. The method of claim 1, further including, in conjunction with the user initiated replication of the selected objects, replicating the selected objects independent of at least one of a replication procedure, a protocol, a file system layout, and an implementation.

* * * * *